April 26, 1938.  B. H. LUSTBERG  2,115,368
SEAM
Filed Aug. 3, 1935
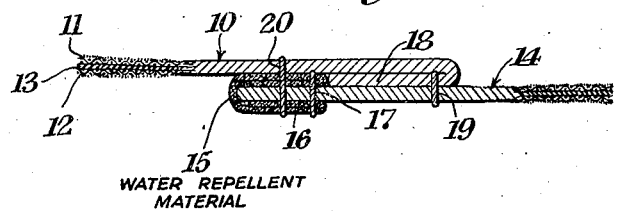
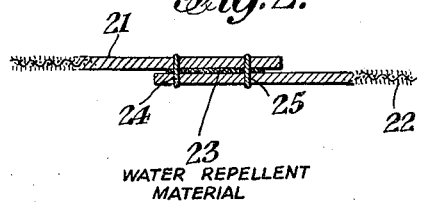
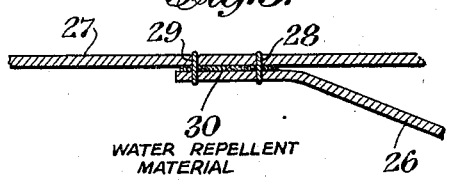
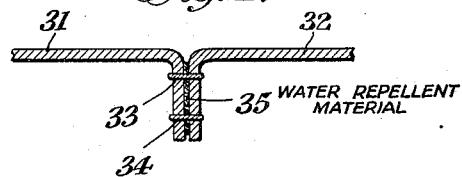
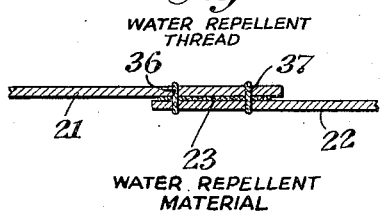
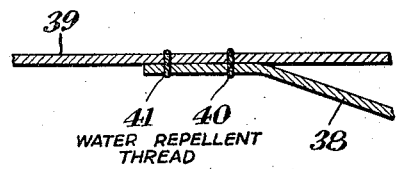
INVENTOR
Benjamin Herbert Lustberg
BY
Kenyon & Kenyon
ATTORNEYS.

Patented Apr. 26, 1938

2,115,368

UNITED STATES PATENT OFFICE 2,115,368

SEAM

Benjamin Herbert Lustberg, Cedarhurst, N. Y.

Application August 3, 1935, Serial No. 34,554

2 Claims. (Cl. 112—262)

This invention relates to seams and is directed especially to seams for joining together sheets of waterproof material.

It is a purpose of this invention to afford a seam for joining sheets of waterproof material, which seam is substantially water-tight.

Heretofore, a variety of articles have been made from waterproof sheet materials and in the manufacture of such articles, it is usually necessary to join sheets of waterproof material by means of seams. For example, raincoats, jackets, and other articles of wearing apparel have been made using waterproof sheet materials of various types, which are joined together by seams. In such articles, difficulties have heretofore been encountered due to the fact that while the sheet materials themselves are waterproof, the seams joining the waterproof materials are not water-tight. In rain-coats, jackets and the like, difficulty due to leaking at the seams has been especially pronounced at the shoulder seams due to the fact that these seams are positioned in the garment so that they are especially subject to being penetrated by water.

It is an advantage of seams embodying this invention that the seams as well as the materials joined thereby may be made water-tight. Thus, according to this invention, shoulder seams of garments made of waterproof material have been made which show no leakage at all when exposed for long periods of time (e. g. 24 hours) to spraying with water. Moreover, watertight seams according to this invention can be made which are strong and durable and which, at the same time can be readily and inexpensively sewed.

One of the features of this invention resides in embodying in a seam joining sheets of waterproof material a sheet or strip of water-repellent material, such as a water-repellent fabric. Thus, from one aspect, the interposition of water-repellent material between two overlying sheets of waterproof material at a seam has been found by me to prevent the seepage of water between the sheets of waterproof material at the place where they are overlying. From another aspect, I have found that if water-repellent material is positioned with respect to the waterproof material so that the stitching at the seam passes through the water-repellent material as well as the waterproof sheets, the seepage of water through the holes in the waterproof sheets caused by the threads is prevented. In many seams, such as the shoulder seams of a garment, leakage may result both from a seepage of water between overlying layers of waterproof material and through the thread holes caused by the stitching at the seam. In preferred practice of this invention, a sheet of water-repellent material is positioned so that it prevents seepage of water between the surfaces of the overlying sheets of waterproof material and so that it prevents water from seeping through the holes in the waterproof material caused by threads of stitching at the seam. In such seam construction, the water-repellent material exercises a double function and acts to prevent leakage of water through the seam from all possible avenues.

Further features of this invention relate to seams wherein sheets of waterproof material are joined using a water-repellent thread. If water-repellent thread is used, it is preferably used in conjunction with a sheet of water-repellent material such as water-repellent fabric used in the manner above mentioned. In some instances, however, certain advantages according to this invention, can be realized in a seam in which the sheet of water-repellent material is omitted and water-repellent threads are used.

In carrying out this invention, various types of waterproof sheets may be employed, depending upon the type of article that is being made. For example, the waterproof sheet material may be a water-proof fabric such as a fabric treated with a dope, of which many types are known, containing rubber, cellulose derivatives, and the like. Such fabrics may be saturated with the dope or treated so as to have the dope occur as a layer on one or both sides thereof. The waterproof sheet may also be made of sheet material other than a fabric such as sheet rubber or the like. While I refer to materials such as the foregoing, as "waterproof", it is to be understood that the term "waterproof" materials includes not only materials which are absolutely waterproof but also other materials suitable for garments or the like which, while not absolutely waterproof, nevertheless are used for their property of resisting the passage of water therethrough. I have experimented with the manufacture of garments such as rain-coats, jackets, and the like made from a type of waterproof material consisting of a layer of cotton suede cloth and a layer of fleece cloth, which layers are cemented together by a waterproof layer, e. g. a layer of rubber cement. While a fabric such as that last named is waterproof, it gives rise to especial difficulties due to leakage at seams. However, even with waterproof fabric of this type, I have been successful in making a watertight seam.

As water-repellent material a variety of materials may be used. Preferably, I use a fabric which has been treated so that it will have water-repellent properties. Such fabrics are well-known. Thus, for example, fabrics coated or saturated with aluminum or zinc salts (e. g. alum) or with an insoluble soap (e. g. aluminum or zinc stearate or a soap of a rare earth) or a waxy or gummy material (e. g. paraffin or camphor) or a combination of such materials may be used as a water-repellent material. In general, any other sheet material presenting one or more water-repellent substances may be used, although water-repellent fabrics are preferred.

Further objects, features and advantages of this invention will become apparent from the following description of certain illustrative embodiments thereof shown in the accompanying drawing, wherein:

Fig. 1 is an end view in section of a seam embodying this invention;

Figs. 2, 3, 4, 5 and 6 are respectively end views in section of different modified forms of seams embodying this invention.

In Fig. 1, a seam embodying this inventon is shown which is preferred especially for the shoulder seams of garments made of waterproof material. The seam in Fig. 1 is shown joining two waterproof fabrics of the type presenting on one surface a suede cloth and on the other surface a fleece lining. One of the sheets of fabric is indicated generally by the reference character 10 and is composed of a layer 11 of cotton suede fabric, a layer 12 of fleece lining cloth, and a layer 13 of rubber cement, the latter layer cementing layers 11 and 12 together and affording a water-impermeable layer which prevents water from penetrating through the fabric as a whole. The structure of the different layers 11, 12 and 13 is shown in a portion only of the sheet 10 so that the detail of the seam construction will be more clear. A second sheet 14 of waterproof material may be similar in structure to sheet 10.

The sheet 14 has along a margin thereof a binding 15 of water-repellent material such as any of the water-repellent sheet materials above described; for example, a fabric treated so as to have water-repellent properties. The binding 15 has inturned portions 16 so as to present unfrayed margins. The binding 15 is secured to the sheet 14 by threads 17 which preferably constitute a row of stitching. The sheet 10 has an inturned portion 18 which is secured to the sheet 14 by threads 19, preferably in the form of stitching. It is to be noted that the stitching 19 only passes through the inturned portion 18 of sheet 10 and does not pass through the body portion of sheet 10, to the outer surface thereof. Sheet 10 is also joined to sheet 14 by threads 20, preferably in the form of stitching, which pass through the body portion of sheet 10, through the margin of sheet 14, and through the binding of water-repellent material at the margin of sheet 14.

A seam of the type shown in Fig. 1 is normally used under conditions wherein the upper surface of sheet 10 is exposed to moisture. It is to be noted that the only holes in the upper surface of sheet 10 which are exposed to the elements and which are caused by the stitching are those caused by the threads of stitching 20. The fact that the threads of this stitching pass through the water-repellent fabric prevents leakage through the thread holes. Moreover, any water that tends to seep between the upper surface of the sheet 14 and the inturned portion 18 of sheet 10 is prevented from penetrating in the seam beyond the binding 15 of water-repellent material. Especially in fabrics of the type shown in Fig. 1 there is a tendency for water to seep through seams. This effect is due to the capillary action or "wicking" of the fibers in the suede cloth and fleece lining. Notwithstanding this tendency, however, the interposition of the sheet of water-repellent material has been found as a result of repeated experiments to keep the water from seeping through between the sheets of waterproof material on either side of the water-repellent material. Likewise even though ordinary threads are used, I have found that water does not tend to follow the threads which have been stitched through the sheet of water-repellent material.

Seams of the type shown in Fig. 1 have been tested under sprays of water for periods of twenty-four hours and longer and have been found to be impervious to the leakage of water therethrough. Likewise, waterproof fabrics having seams of the type shown in Fig. 1 have been made in the form of a cup in which water has been held for long periods of time without water leaking through as drops or wicking into the inner surface of the fabric.

In Fig. 2, a simpler form of seam is shown. In this figure, two sheets of fabric 21 and 22 are shown. These fabrics may consist simply of a cloth saturated with some dope which makes the cloth waterproof. The character of the cloth is represented in a portion only of Fig. 2 in order that the seam construction may appear more clearly. The sheets 21 and 22 have marginal portions overlying each other as shown. Directly interposed between these marginal portions is a strip or sheet 23 of water-repellent material such as a fabric treated so as to have the property of water-repellency. The threads of rows of stitching 24 and 25 pass through the sheets 21 and 22 and through the strip of water-repellent material.

Even with the simple construction shown in Fig. 2, the seepage of water between the adjacent opposed surfaces of sheets 21 and 22 is prevented by the strip of water-repellent material. Likewise, the passage of water through the holes in the fabric caused by the threads of stitching 24 and 25 is prevented by the strip of water-repellent material.

It is apparent in Fig. 2 that the water-repellent material may be disposed as shown in Fig. 2 or may be disposed as bindings for the margins of sheets 21 and 22, as shown in Fig. 1. Likewise, either or both of the margins of sheets 21 and 22 may have inturned portions as shown in Fig. 1.

In Fig. 3, a seam embodying this invention is shown whereby a margin of one sheet 26 of waterproof material is joined to an intermediate portion of a sheet 27 of waterproof material. This type of seam is shown in order to afford an illustration of a seam in which the only possibility of leakage is around the threads of stitching 28 and 29 when the upper surface of sheet 27 is exposed to water. The strip of water-repellent material 30, through which the stitching passes, effectively prevents the leakage of water through the holes in the sheet 27 caused by stitching 28 and 29.

In Fig. 4, a seam is shown in which the only possibility of leakage is between the opposed surfaces of sheets of waterproof material 31 and 32. The margins of sheets 31 and 32 are joined by threads of stitching 33 and 34, which stitching passes through water-repellent material 35 directly interposed between the marginal portions of sheets 31 and 32. If the seam is subjected to water only at the upper surface of sheets 31 and 32, the leakage can only occur between the opposed surfaces of the marginal portions of these sheets. However, the water-repellent material 25 is effective to prevent this leakage.

In Fig. 5, a seam is shown which is similar to the seam shown in Fig. 2 and the elements thereof are indicated by the same reference characters used in connection with Fig. 2 with the exception of the threads of the stitching. In Fig. 5, the threads of the stitching 36 and 37 are treated so as to have water-repellent properties. Thus the threads may be treated with any of the water-repellent substances mentioned above in connection with the treatment of fabrics to make fabrics water-repellent. I have found that the use of water-repellent threads results in some additional benefit as compared with seams which do not comprise water-repellent threads. Water-repellent threads may also be used in other types of seams in conjunction with a sheet or strip of water-repellent fabric. For example, water-repellent threads may be used in any of the seams above described.

In Fig. 6, a seam is shown which joins the margin of a waterproof sheet 38 with an intermediate portion of a waterproof sheet 39, the seam including water-repellent threads of stitching 40 and 41. Particularly in this type of seam where danger of leakage is only from the passage of water from the outer surface of sheet 39 through the holes in sheet 39 caused by the threads of stitching 40 and 41, the use of water-repellent threads is of some effectiveness in preventing leakage at the seam. Moreover, it is apparent that the use of water-repellent threads may also be used without a strip of water-repellent material in other types of seams, but particularly in those seams which are subject to leakage between opposed surfaces of sheets joined together by stitching, the use of water-repellent threads without a strip of water-repellent material between the opposed surfaces of the sheets is less desirable as compared to use of a strip of water-repellent fabric as hereinabove described. Those seam structures which include a sheet or strip of water-repellent fabric or other sheet of water-repellent material, either with or without water-repellent threads are regarded as preferred embodiments of this invention.

While this invention has been described in connection with certain specific embodiments thereof, it is to be understood that this has been done merely for the purpose of illustrating the practice of this invention and that seams within the scope of this invention may take several different forms in addition to those herein described.

I claim:

1. A seam, comprising a first sheet of waterproof material, a second sheet of waterproof material, a binding of water-repellent material along a marginal portion of one of said sheets, the water-repellency of said binding being substantially greater than any water-repellency possessed by said first and second sheets of waterproof material, said marginal portion being joined to a portion of the other sheet of waterproof material by threads passing through a layer of said water-repellent binding material on each side of said marginal portion and between said first and second sheets of waterproof material.

2. A seam comprising a first sheet of waterproof material having a rubberized core and presenting free fibers on both surfaces, a second sheet of waterproof material having a rubberized core and presenting free fibers on both surfaces, a binding of non-waterproof fabric carrying thereon a water-repellent substance having substantially greater water-repellency than any water-repellency possessed by said sheets of waterproof material which binding is disposed along a marginal portion of said second sheet of material and attached thereto by first stitching which does not pass through said first sheet of material and one surface of said binding being in juxtaposition with a portion of said first sheet, an inturned marginal portion of said first sheet in juxtaposition with a portion of said second sheet and joined to said second sheet by second stitching passing through only said inturned portion of said first sheet and said second sheet, and third stitching passing through said binding of water-repellent fabric, said second sheet and the body portion of said first sheet.

BENJAMIN HERBERT LUSTBERG.